United States Patent
Lawliss et al.

(10) Patent No.: US 11,725,531 B2
(45) Date of Patent: Aug. 15, 2023

(54) BORE COMPARTMENT SEALS FOR GAS TURBINE ENGINES

(71) Applicant: Raytheon Technologies Corporation, Farmington, CT (US)

(72) Inventors: Nicholas J. Lawliss, West Hartford, CT (US); Paul Boules, Wallingford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/532,041

(22) Filed: Nov. 22, 2021

(65) Prior Publication Data

US 2023/0160315 A1 May 25, 2023

(51) Int. Cl.
| | |
|---|---|
| F01D 11/00 | (2006.01) |
| F01D 5/08 | (2006.01) |
| F04D 29/58 | (2006.01) |
| F01D 5/06 | (2006.01) |
| F16D 3/72 | (2006.01) |

(52) U.S. Cl.
CPC ............ *F01D 11/005* (2013.01); *F01D 5/085* (2013.01); *F04D 29/584* (2013.01); *F01D 5/066* (2013.01); *F05D 2240/55* (2013.01); *F05D 2250/11* (2013.01); *F05D 2250/121* (2013.01); *F16D 3/72* (2013.01)

(58) Field of Classification Search
CPC ... F01D 5/066; F16D 3/66; F16D 3/72; Y10T 403/453; F04D 29/584
USPC ............................. 285/226, 227; 464/58–60
See application file for complete search history.

(56) References Cited

U.S. PATENT DOCUMENTS

| | | | | |
|---|---|---|---|---|
| 3,647,313 | A | * | 3/1972 | Koff ................. F01D 5/084 416/198 A |
| 4,750,746 | A | * | 6/1988 | Boudot ............. F16J 15/184 415/230 |
| 5,472,313 | A | | 12/1995 | Quinones et al. |
| 6,695,705 | B2 | * | 2/2004 | Stervik ............. F16D 3/725 464/181 |

(Continued)

FOREIGN PATENT DOCUMENTS

| | | |
|---|---|---|
| EP | 3192968 A1 | 7/2017 |
| EP | 3225780 A1 | 10/2017 |
| WO | 2021074508 A1 | 4/2021 |

OTHER PUBLICATIONS

Extended European Search Report dated Apr. 6, 2023; EP Application No. 22208943.5-1004; 7 Pages.

*Primary Examiner* — Igor Kershteyn
*Assistant Examiner* — Wesley Le Fisher
(74) *Attorney, Agent, or Firm* — Cantor Colburn LLP

(57) ABSTRACT

Rotor systems including an engine shaft, a forward hub, a rear hub, a rotor disk arranged between the forward hub and the rear hub, and a seal tube configured to define a forward hub compartment and a rear hub compartment. The forward hub compartment is defined forward of the rotor disk and the rear hub compartment is defined aft of the rotor disk. The seal tube is connected at a forward end to at least one of the rotor disk and the engine shaft and at a rear end to at least one of the rear hub and the engine shaft and the seal tube includes at least one axial compliance element configured to enable axial extension and compression of the seal tube in an axial direction along the engine shaft.

20 Claims, 8 Drawing Sheets

(56) References Cited

U.S. PATENT DOCUMENTS

| | | | |
|---|---|---|---|
| 8,387,401 B2* | 3/2013 | Hashimoto | F01D 11/005 |
| | | | 415/115 |
| 8,523,686 B2* | 9/2013 | Goujet | F16D 3/72 |
| | | | 464/79 |
| 8,540,482 B2* | 9/2013 | Malmborg | F01D 5/025 |
| | | | 416/198 A |
| 9,777,576 B2* | 10/2017 | Maguire | F01D 5/06 |
| 10,508,714 B2* | 12/2019 | Grubba | F01D 5/026 |
| 10,655,480 B2* | 5/2020 | Porter | F01D 5/066 |
| 10,808,627 B2* | 10/2020 | Behling | F01D 5/081 |
| 10,837,288 B2* | 11/2020 | Suciu | F04D 29/584 |
| 11,060,530 B2* | 7/2021 | Petrasko | F01D 5/087 |
| 11,525,400 B2* | 12/2022 | Namadevan | F02C 7/18 |
| 2019/0203600 A1 | 7/2019 | Petrasko et al. | |
| 2019/0292995 A1* | 9/2019 | Behling | F01D 5/081 |
| 2020/0025210 A1* | 1/2020 | Porter | F01D 5/066 |
| 2020/0378307 A1 | 12/2020 | Roberge | |
| 2021/0071578 A1* | 3/2021 | Scholtes | F02C 6/08 |
| 2021/0381381 A1* | 12/2021 | Hartnagel | F01D 5/026 |
| 2022/0145805 A1* | 5/2022 | Negri | F02C 7/36 |

* cited by examiner

BORE COMPARTMENT SEALS FOR GAS TURBINE ENGINES

BACKGROUND

The subject matter disclosed herein generally relates to rotor systems of gas turbine engines and, more particularly, to seals for separating bore compartments in rotor systems of gas turbine engines.

In turbomachinery (e.g., gas turbine engines), compressor air is used to cool the turbine. The cooling air that is bled from the compressor flowpath and supplied to the rear bore compartment typically has high temperature and pressure. In contrast, the forward compressor bore compartment contains relatively lower temperature and pressure air. To maintain rotor durability and performance, it is advantageous to avoid mixing of the two air supplies. Such separation may require the forward and rear bore compartments to be sealed from one another. One current solution is to use a piston seal ring between a tie shaft and a rotor bore. However, relative motion and vibration at this interface of the piston seal ring has led to high wear rates and loss of sealing. Accordingly, improved compartment sealing will improve rotor durability and engine performance.

SUMMARY

According to some embodiment, rotor systems are provided. The rotor systems include an engine shaft, a forward hub, a rear hub, a rotor disk arranged between the forward hub and the rear hub, and a seal tube configured to define a forward hub compartment and a rear hub compartment, wherein the forward hub compartment is defined forward of the rotor disk and the rear hub compartment is defined aft of the rotor disk. The seal tube is connected at a forward end to at least one of the rotor disk and the engine shaft and at a rear end to at least one of the rear hub and the engine shaft, and the seal tube includes at least one axial compliance element configured to enable axial extension and compression of the seal tube in an axial direction along the engine shaft.

In addition to one or more of the features described herein, or as an alternative, further embodiments of the rotor systems may include a second rotor disk arranged forward of the rotor disk within the forward hub compartment.

In addition to one or more of the features described herein, or as an alternative, further embodiments of the rotor systems may include a second rotor disk arranged aft of the rotor disk within the rear hub compartment.

In addition to one or more of the features described herein, or as an alternative, further embodiments of the rotor systems may include that the at least one axial compliance element comprises a plurality of axial compliance elements between the forward end and the rear end of the seal tube.

In addition to one or more of the features described herein, or as an alternative, further embodiments of the rotor systems may include that at least two axial compliance elements of the plurality of axial compliance elements have different radial heights.

In addition to one or more of the features described herein, or as an alternative, further embodiments of the rotor systems may include that at least two axial compliance elements of the plurality of axial compliance elements have different axial lengths.

In addition to one or more of the features described herein, or as an alternative, further embodiments of the rotor systems may include that at least two axial compliance elements of the plurality of axial compliance elements have different geometric shapes.

In addition to one or more of the features described herein, or as an alternative, further embodiments of the rotor systems may include that at least two axial compliance elements of the plurality of axial compliance elements have different material thicknesses.

In addition to one or more of the features described herein, or as an alternative, further embodiments of the rotor systems may include that the at least one axial compliance element has a squared geometry.

In addition to one or more of the features described herein, or as an alternative, further embodiments of the rotor systems may include that the at least one axial compliance element has a rounded geometry.

In addition to one or more of the features described herein, or as an alternative, further embodiments of the rotor systems may include that the at least one axial compliance element has a triangular geometry.

In addition to one or more of the features described herein, or as an alternative, further embodiments of the rotor systems may include that the forward hub, the rear hub, and the rotor disk form a portion of a compressor section of a gas turbine engine.

In addition to one or more of the features described herein, or as an alternative, further embodiments of the rotor systems may include that the forward hub, the rear hub, and the rotor disk form a portion of a turbine section of a gas turbine engine.

In addition to one or more of the features described herein, or as an alternative, further embodiments of the rotor systems may include a plurality of airfoils connected to the rotor disk.

In addition to one or more of the features described herein, or as an alternative, further embodiments of the rotor systems may include that the seal tube connects at the forward end by one of radial snap fit, axial snap fit, welding, threaded connection, or interference fit.

In addition to one or more of the features described herein, or as an alternative, further embodiments of the rotor systems may include that the seal tube connects at the rear end by one of radial snap fit, axial snap fit, welding, threaded connection, or interference fit.

In addition to one or more of the features described herein, or as an alternative, further embodiments of the rotor systems may include that the engine shaft is a tie shaft and the seal tube connects to the tie shaft at at least one of the forward end and the rear end.

According to some embodiments, gas turbine engines are provided. The gas turbine engines include a combustor section, a turbine section, a compressor section, and an engine shaft. At least one of the turbine section and the compressor section includes a rotor system having a forward hub, a rear hub, a rotor disk arranged between the forward hub and the rear hub, and a seal tube configured to define a forward hub compartment and a rear hub compartment, wherein the forward hub compartment is defined forward of the rotor disk and the rear hub compartment is defined aft of the rotor disk. The seal tube is connected at a forward end to at least one of the rotor disk and the engine shaft and at a rear end to at least one of the rear hub and the engine shaft, and the seal tube includes at least one axial compliance element configured to enable axial extension.

In addition to one or more of the features described herein, or as an alternative, further embodiments of the gas turbine engines may include that the at least one axial compliance element comprises a plurality of axial compliance elements between the forward end and the rear end of the seal tube.

In addition to one or more of the features described herein, or as an alternative, further embodiments of the gas turbine engines may include that the at least one axial compliance element has one of a squared geometry, a rounded geometry, and a triangular geometry.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
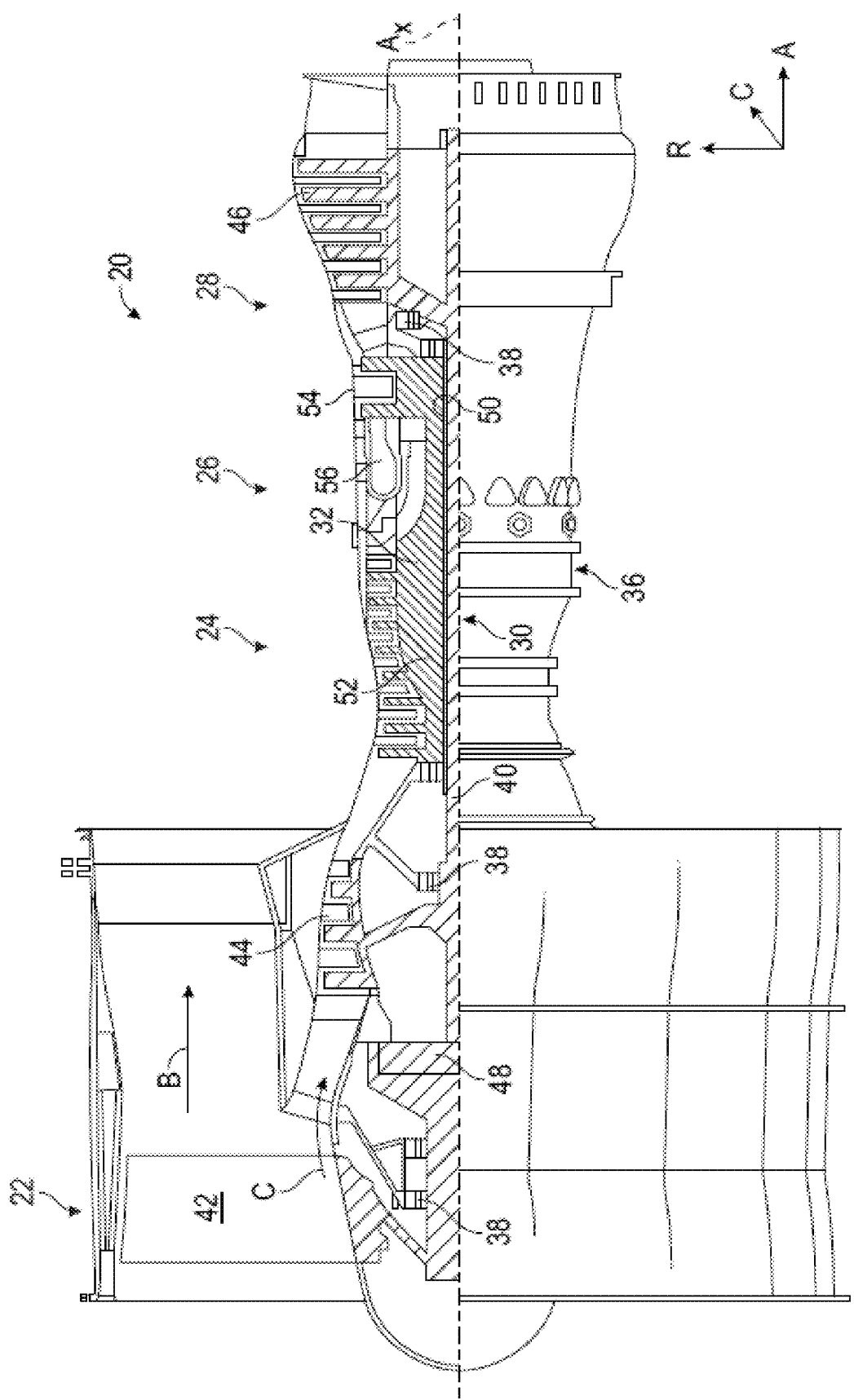
FIG. 1 is a schematic cross-sectional illustration of a gas turbine engine.

As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Detailed descriptions of one or more embodiments of the disclosed apparatus and/or methods are presented herein by way of exemplification and not limitation with reference to the Figures.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. With reference to FIG. 1, as used herein, "aft" refers to the direction associated with the tail (e.g., the back end) of an aircraft, or generally, to the direction of exhaust of the gas turbine engine (to the right in FIG. 1). The term "forward" refers to the direction associated with the nose (e.g., the front end) of an aircraft, or generally, to the direction of flight or motion (to the left in FIG. 1). An axial direction A is along an engine central longitudinal axis Ax (left and right on FIG. 1). Further, radially inward refers to a negative radial direction relative to the engine axis Ax and radially outward refers to a positive radial direction (radial being up and down in the cross-section of the page of FIG. 1). A circumferential direction C is a direction relative to the engine axis Ax (e.g., a direction of rotation of components of the engine; in FIG. 1, circumferential is a direction into and out of the page, when offset from the engine axis Ax). An A-R-C axis is shown throughout the drawings to illustrate the relative position of various components.

The exemplary engine 20 generally includes a low speed spool 30 and a high speed spool 32 mounted for rotation about the engine central longitudinal axis Ax relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis Ax which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle.

The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, etc.

Figure 2:
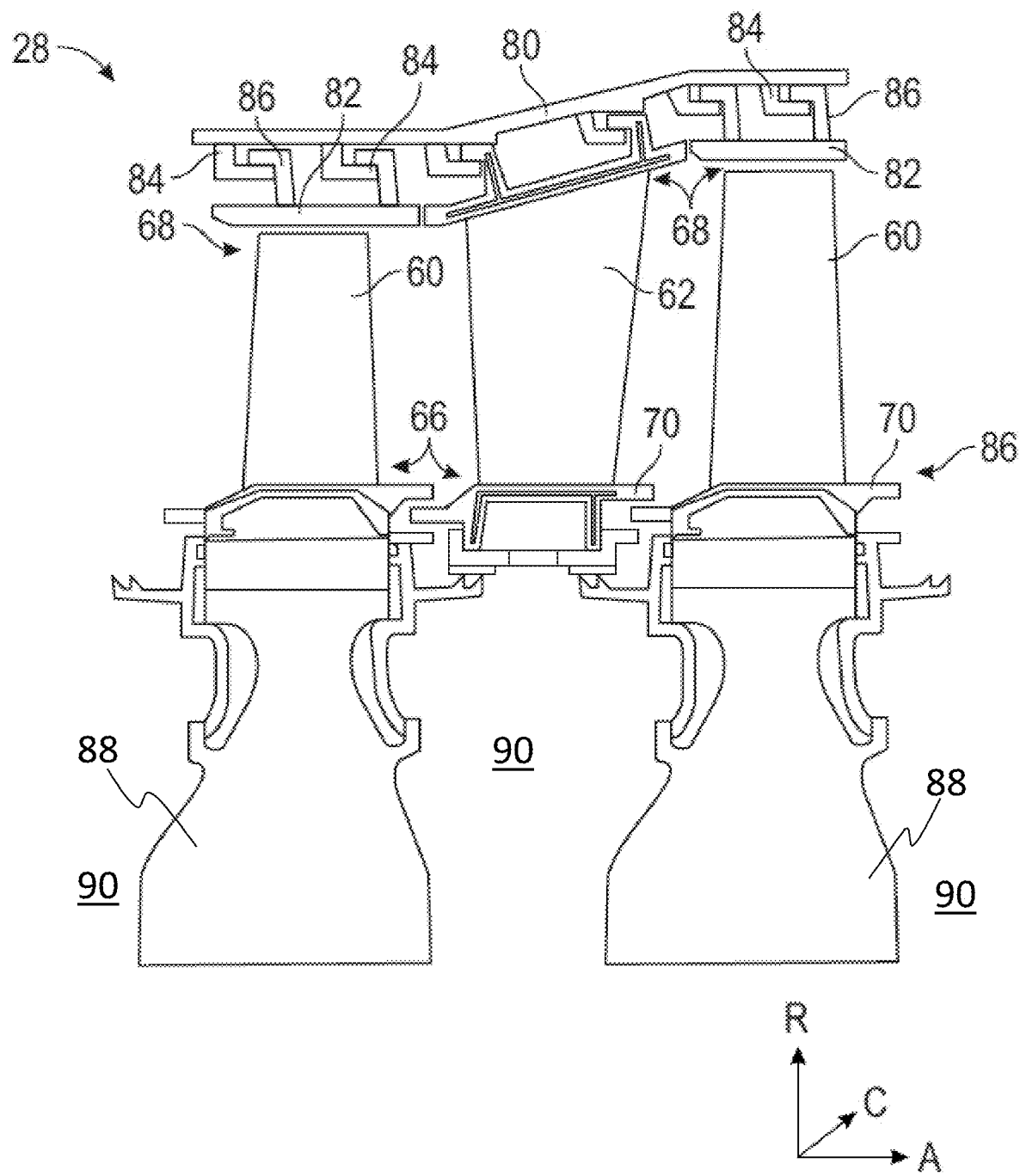
FIG. 2 is a schematic illustration of a portion of a turbine section of the gas turbine engine of FIG. 1.

The turbine section 28 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports that are configured to fixedly connect or attach the BOAS 82 to the case 80 (e.g., the BOAS supports may be located between the BOAS 82 and the case 80). As shown in FIG. 2, the case 80 includes a plurality of case hooks 84 that engage with BOAS hooks 86 to secure the BOAS 82 between the case 80 and a tip of the airfoil 60.

The blades 60 are mounted, attached to, or otherwise part of respective rotor disks 88. Between the rotor disks 88 are cavities 90. The cavities 90 are defined on forward and aft (axially) sides of the rotor disks 88. Cooling air is supplied to the rotor disks 88 within the cavities 90 for the purpose of cooling the rotor disks 88, other components of the system, and/or for supplying cooling air into and around the airfoils 60, 62 and components thereof.

Typically, in gas turbine engines and other turbomachinery, compressor air can be used to cool the turbine. In some such configurations, cooling air that is bled from a compressor flow path travels through a rear bore compartment on the way to the turbine, having high temperatures and pressures. However, the forward bore compartment contains relatively lower temperature and pressure air which is being routed to cool other engine components. To maintain rotor durability and performance it is crucial to avoid mixing of the two air supplies. This requires the forward and rear bore compartments to be sealed from one another.

Figure 3:
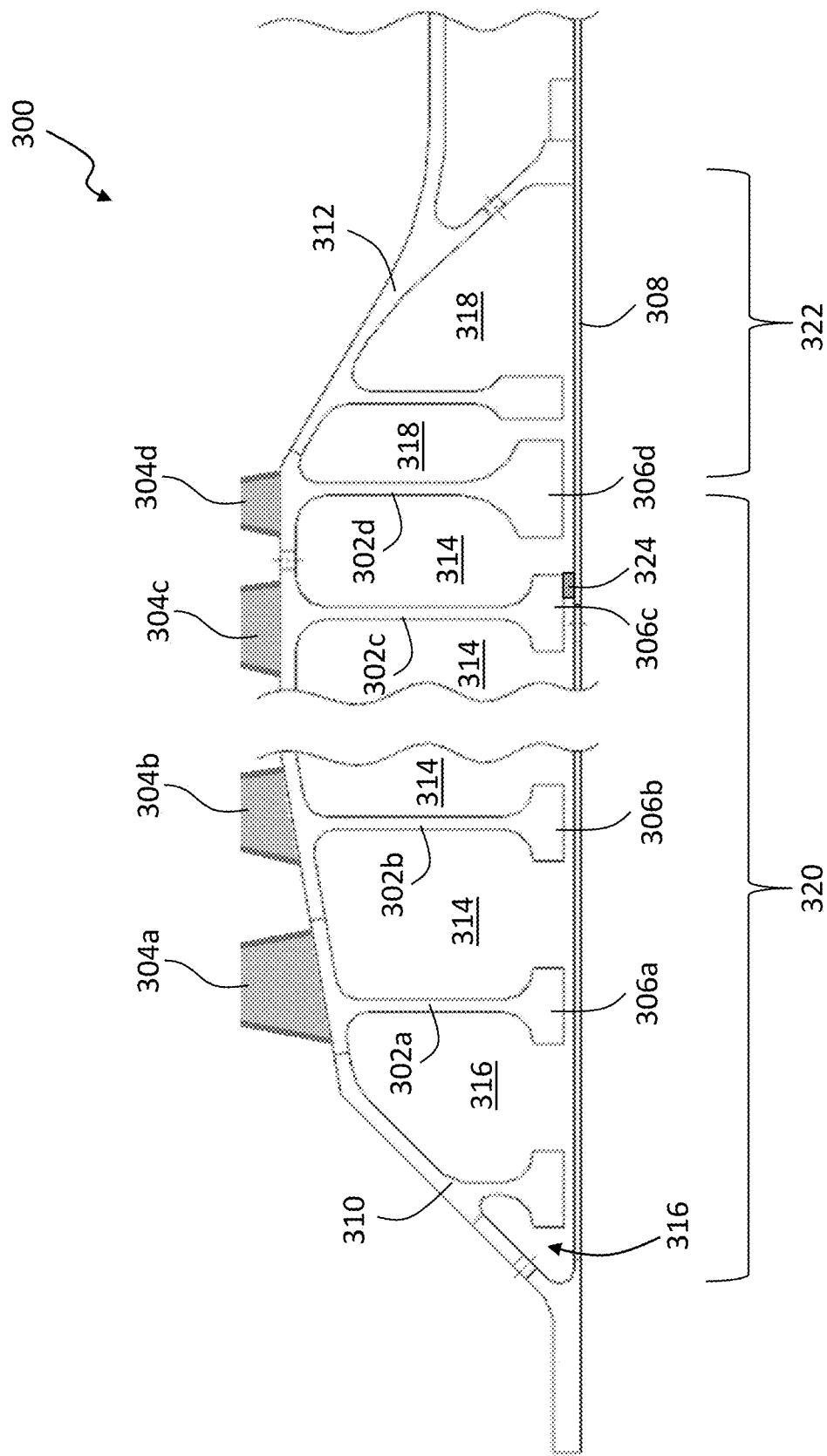
FIG. 3 is a schematic illustration of a conventional rotor system of a gas turbine engine that may incorporate embodiments of the present disclosure.

For example, turning now to FIG. 3, a schematic illustration of a conventional rotor system 300 of a gas turbine engine is shown. The rotor system 300 may be part of an engine as shown and described above. The rotor system 300 may be a compressor section or a turbine section of a gas turbine engine, for example. As shown, the rotor system 300 is formed of a group of rotor disks 302a-d which each include respective airfoils 304a-d connected thereto. The airfoils 304a-d may be connected to the rotor disks 302a-d through known means, such as mounting configurations, integrally formed blades, platform attachments, or the like. In this illustrative partial view, the rotor system 300 includes four rotor disks 302a-d with associated airfoils 304a-d. However, it will be appreciated that rotor systems that incorporate embodiments of the present disclosure may include any number of rotor disks and associated blades. Each rotor disk 302a-d includes a respective rotor bore 306a-d. The rotor disks 302a-d may be arranged about an engine shaft 308 (e.g., tie shaft). Forward of a forward-most rotor disk 302a is a forward hub 310 and aft of an aft-most rotor disk 302d is a rear hub 312. The forward hub 310 and the rear hub 312 may each connect to the engine shaft 308.

Between adjacent rotor disks 302a-302d are defined rotor cavities 314. Further, a forward cavity 316 is defined between the forward-most rotor disk 302a and the forward hub 310. Similarly, a rear cavity 318 is defined between the aft-most rotor disk 302d and the rear hub 312. The cavities 314, 316, 318 are configured to receive air to provide cooling to the rotor disks 302a-d and/or for cooling other components of the rotor system 300 and/or other (e.g., downstream) components and/or sections of the turbine engine.

The cavities 314, 316, 318 may be fluidly connected such that cooling flow can pass from a forward end toward an aft end of the series of cavities 314, 316, 318. It may be advantageous to separate portions of the cavities 314, 316, 318. For example, a forward bore compartment 320 and a rear bore compartment 322 may be defined and fluidly separate from each other, with each bore compartment 320, 322 defined by one or more of the cavities 314, 316, 318. In this illustrative embodiment, the forward bore compartment 320 is defined by the forward cavity 316 and the rotor cavities 314 and the rear bore compartment 322 is formed of the rear cavity 318. The fluid separation of the forward bore compartment 320 from the rear bore compartment 322 may be achieved using a sealing element 324. The sealing element 324 may be, in some configurations, a piston seal ring that engages and seals between the engine shaft 308 and the aft most rotor bore 306c that defines the forward bore compartment 320. In some configurations, the rear bore compartment 318 may include one or more of the rotor cavities 314, with the sealing element 324 being arranged between the engine shaft 308 and a more forward rotor disk. For example, the sealing element 324 may be arranged between the second-to-aft-most rotor disk 306c, and thus the aft-most rotor disk 306d may be arranged within the rear bore compartment 322.

A drawback to such sealing elements is that they may form imperfect seals, thus allowing for bleed between the forward and rear bore compartments. For example, relative motion and vibration at the location of the sealing element may lead to high wear rates of the seals, causing degradation and/or failure thereof. Upon degradation or failure, the two previously fluidly separate compartments will become fluidly connected. This fluid connection can cause a rise in temperature in the forward bore compartment due to the relatively hot/high pressure air from the rear bore compartment flowing into the forward bore compartment. This in turn can result in lower efficiency and/or undesired operating temperatures.

In view of this, and in view of other considerations, embodiments of the present disclosure are directed to improved sealing configurations for turbine sections and/or compressor sections (i.e., rotor system) of gas turbine engines. In accordance with some embodiments, an axially compliant sealing tube is arranged to connect between two rotor stages via interface retention features. In one non-limiting embodiment, axial and radial snaps can be employed at the interface between the sealing tube and a part of the rotor system. However, it will be appreciated that a variety of other interface retention features can be used without departing from the scope of the present disclosure. For example, and without limitation, the connection between the sealing tube and the rotor system can include snap fits (radial and/or axial), snap rings, welding, threaded connections, interference fits, etc., and/or combinations thereof.

Figure 4A:
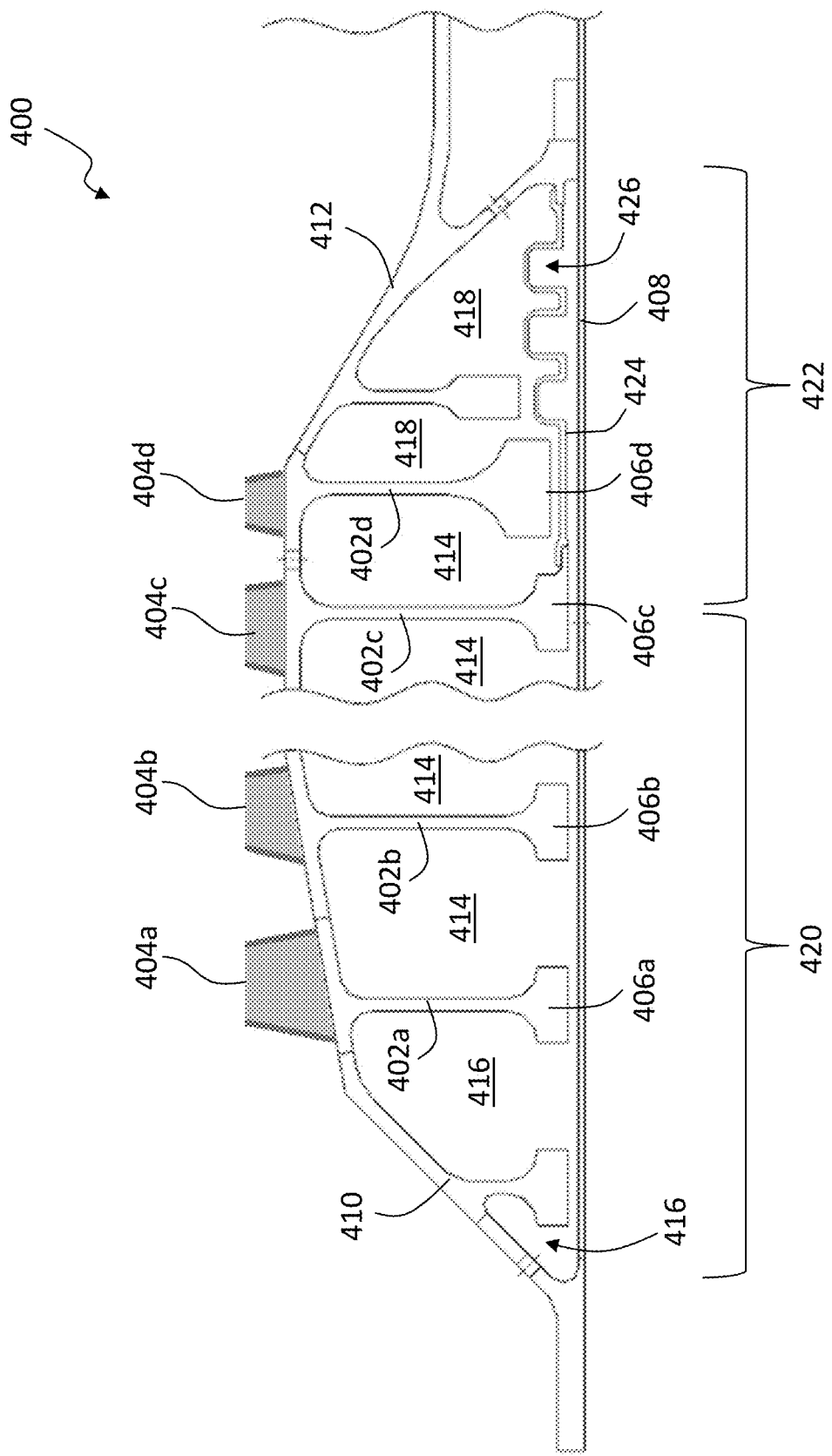
FIG. 4A is a schematic illustration of a rotor system of a gas turbine engine in accordance with an embodiment of the present disclosure.
Figure 4B:
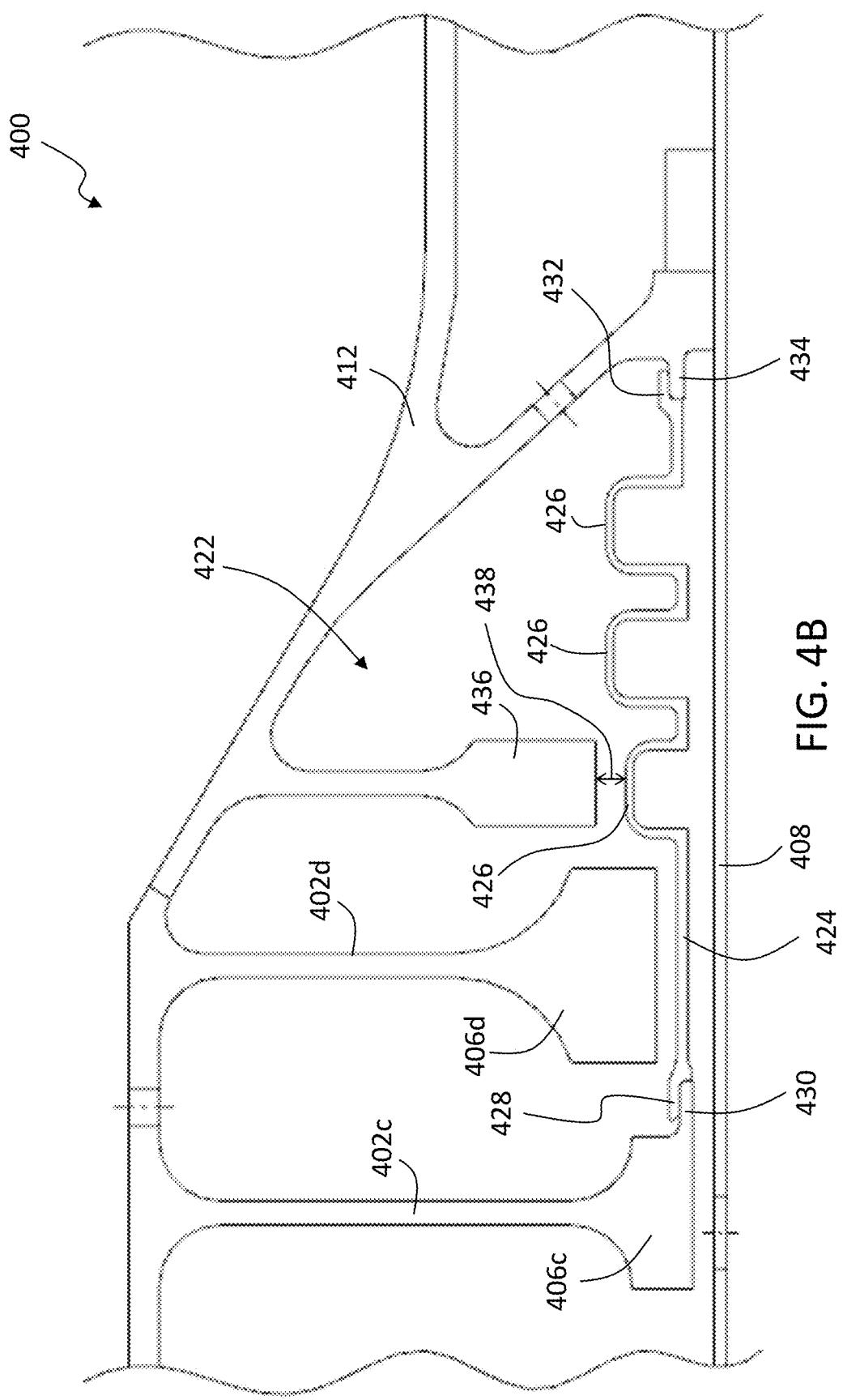
FIG. 4B is an enlarged illustration of a portion of the rotor system shown in FIG. 4A.

The seal tube, in accordance with embodiments of the present disclosure, is an axially compliant structure that provides sealing between bore compartments while allowing or accommodating relative motion, vibrations, thermal expansion, etc. In some embodiments, the seal tubes described herein may include one or more undulation features that allow the tube to act as a soft spring in an axial direction. The size, shape, and quantity of the undulations can be used to tune a spring rate of the seal tube based on system requirements. A low spring rate of the seal tube can allow the seal tube to be compressed during assembly and operation with relatively low force. The assembly compression may be sufficient to keep the seal tube interface retention features seated on the rotors (or other seating structures) during operation when pressure, speed, and temperature loads cause the rotors and/or hubs of the rotor system to deflect away from one another. Such compression/expansion of the seal element is beneficial because it can reduce sliding motion on the interfaces, which in turn can reduce wear. The reduction in wear may improve rotor durability and reduce binding load caused by such wear. In addition to the seal element itself providing a fluid barrier, interface retention features that hold the seal tube in place can act as seals which prevent mixing of the forward and rear bore compartment air.

turning now to FIGS. 4A-4B, schematic illustrations of a rotor system 400 of a gas turbine engine in accordance with an embodiment of the present disclosure are shown. The rotor system 400 may be part of an engine as shown and described above. The rotor system 400 may be a compressor section or a turbine section of a gas turbine engine, for example. As shown, the rotor system 400 is formed of a group of rotor disks 402a-d which each include respective airfoils 404a-d connected thereto. The airfoils 404a-d may be connected to the rotor disks 402a-d through known means, such as mounting configurations, integrally formed blades, platform attachments, or the like. In this illustrative partial view, the rotor system 400 includes four rotor disks 402a-d with associated airfoils 404a-d. However, it will be appreciated that rotor systems that incorporate embodiments of the present disclosure may include any number of rotor disks and associated blades. Each rotor disk 402a-d includes a respective rotor bore 406a-d. The rotor disks 402a-d may be arranged about a engine shaft 408. Forward of a forward-most rotor disk 402a is a forward hub 410 and aft of an aft-most rotor disk 402d is a rear hub 412. The forward hub 410 and the rear hub 412 may each connect to the engine shaft 408.

Between adjacent rotor disks 402a-402d are defined rotor cavities 414. Further, a forward cavity 416 is defined between the forward-most rotor disk 402a and the forward hub 410. Similarly, a rear cavity 418 is defined between the aft-most rotor disk 402d and the rear hub 412. The cavities 414, 416, 418 are configured to receive air to provide cooling to the rotor disks 402a-d and/or for cooling other components of the rotor system 400 and/or other (e.g., downstream) components and/or sections of the turbine engine.

The cavities 414, 416, 418 may be fluidly connected such that cooling flow can pass from a forward end toward an aft end of the series of cavities 414, 416, 418. It may be advantageous to separate portions of the cavities 414, 416, 418. For example, a forward bore compartment 420 and a rear bore compartment 422 may be defined and fluidly separate from each other, with each bore compartment 420, 422 defined by one or more of the cavities 414, 416, 418. In this illustrative embodiment, the forward bore compartment 420 is defined by the forward cavity 416 and the rotor cavities 414 and the rear bore compartment 422 is formed of the rear cavity 418 and one of the rotor cavities 414 (e.g., forward of the aft-most rotor disk 402d).

In this illustrative embodiment, a seal tube 424 is arranged to fluidly separate the forward bore compartment 420 and the rear bore compartment 422. The seal tube 424 is a hoop structure or basket structure that is arranged about the engine shaft 408 during assembly of the rotor system 400. The seal tube 424 may include one or more axial compliance elements 426 along an axial length thereof. The axial compliance elements 426 allow for or enable axial extension and compression of the seal tube 424 without unseating the seal tube 424 from engagement with the rotor system 400. As shown in FIG. 4B, a forward end 428 of the seal tube 424 engages with a portion 430 of a rotor hub 406c. Similarly, a rear end 432 of the seal tube 424 engages with a portion 434 of the rear hub 412. As such, the seal tube 424 can provide a fluid barrier between the forward bore compartment 420 and the rear bore compartment 422. Although illustratively shown as a single, unitary structure, in other embodiments, the seal tube 424 may be formed from two or more sub-rings or sub-tubes that are sealingly joined together to form the structure of the seal tube 424.

As shown in FIG. 4B, the rear bore compartment 422 extends in an axial forward direction from the rear hub 412 to the second-aft-most rotor disk 402c. As such, the aft-most rotor disk 402d is thus wholly positioned within the rear bore compartment 422. Additionally, as shown, the rear hub 412 may include a rear bore 436, as will be appreciated by those of skill in the art, which is also arranged within the rear bore compartment 422.

In this illustrative embodiment, the seal tube 424 is configured with three axial compliance elements 426. The axial compliance elements 426, in this embodiment, are convolutions or undulations of material of the seal tube 424. The axial compliance elements 426 may take any desired shape, size, and form to achieve a desired amount of axial compliance (e.g., compression and expansion in an axial direction along the engine, such as along the engine shaft 408). For example, alternative geometric shapes, changes or variations in material thickness, radial height, axial length, etc. may all be properties of the axial compliance elements 426 that may be adjusted or changed to achieve a desired axial compliance and maintaining a fluid seal between the bore compartments 420, 422.

As shown in FIGS. 4A-4B, one of the axial compliance elements 426 may be arranged radially inward from a bore (e.g., rear bore 436). In such configurations, a gap 438 may be defined between the bore and the material of the seal tube 424. The rear bore 436 and/or the axial compliance element 426 are arranged to form the gap 438 and prevent contact between the two elements during operation.

Although FIGS. 4A-4B illustrate a single configuration, those of skill in the art will appreciate that variations thereon are possible without departing from the scope of the present disclosure. For example, the seal tube 424 includes three axial compliance elements 426, although in other embodiments, as few as a single axial compliance element may be employed, or in other embodiments more than three may be used. Further, although shown with a substantially curved-square undulation geometry, the geometry of such undulations may be varied, such as curved, rounded, triangular, polygonal, etc. Further, the material thickness of the seal tube 424 may be uniform from the forward end 428 to the rear end 432. However, in other embodiments, the material thickness of the seal tube may be varied along the axial length thereof. For example, increased material thickness may be provided at the forward and rear ends, with a lower material thickness at the axial compliance elements. The opposite may be true, with a greater thickness at the axial compliance elements and less thickness at the ends that join to the components of the rotor system. Additionally, in the illustrative embodiment of FIGS. 4A-4B, the seal tube 424 is attached to a rotor bore 406c and the rear hub 412. In other embodiments, the seal tube may be attached to (at either or both ends) the engine shaft 408, or to other appropriate structures. Such mounting will still be intended to form the rear bore compartment 422, regardless of the specific mounting configuration.

Figure 5:
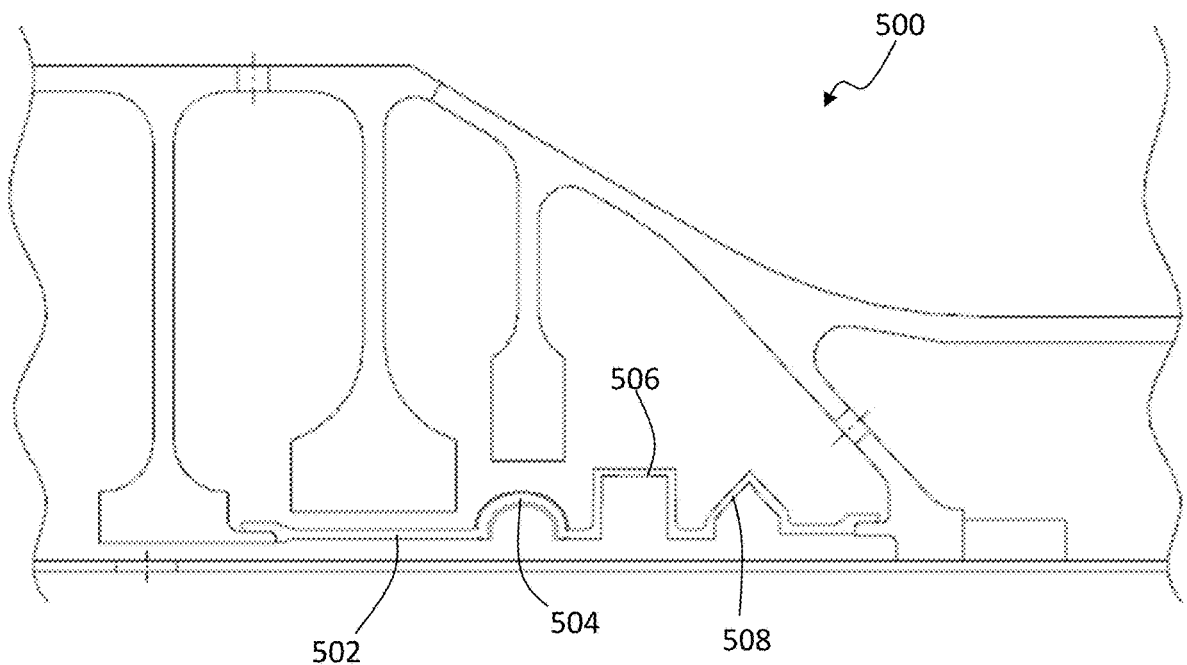
FIG. 5 is a schematic illustration of a rotor system of a gas turbine engine in accordance with an embodiment of the present disclosure.

Turning now to FIG. 5, a schematic illustration of a portion of a rotor system 500 having a seal tube 502 in accordance with an embodiment of the present disclosure is shown. The seal tube 502 is arranged to provide a fluid seal between a forward bore compartment and a rear bore compartment, similar to that described above. In this embodiment, the seal tube 502 includes a rounded axial compliance element 504, a squared axial compliance element 506, and a triangular axial compliance element 508. In this embodiment, the different geometries are illustrated in the single seal tube 502, thus having multiple different geometric axial compliance elements. However, in other embodiments, each axial compliance element of a seal tube may have the same geometry as all other axial compliance elements, although a mixture, as illustrated may also be employed.

Figure 6:
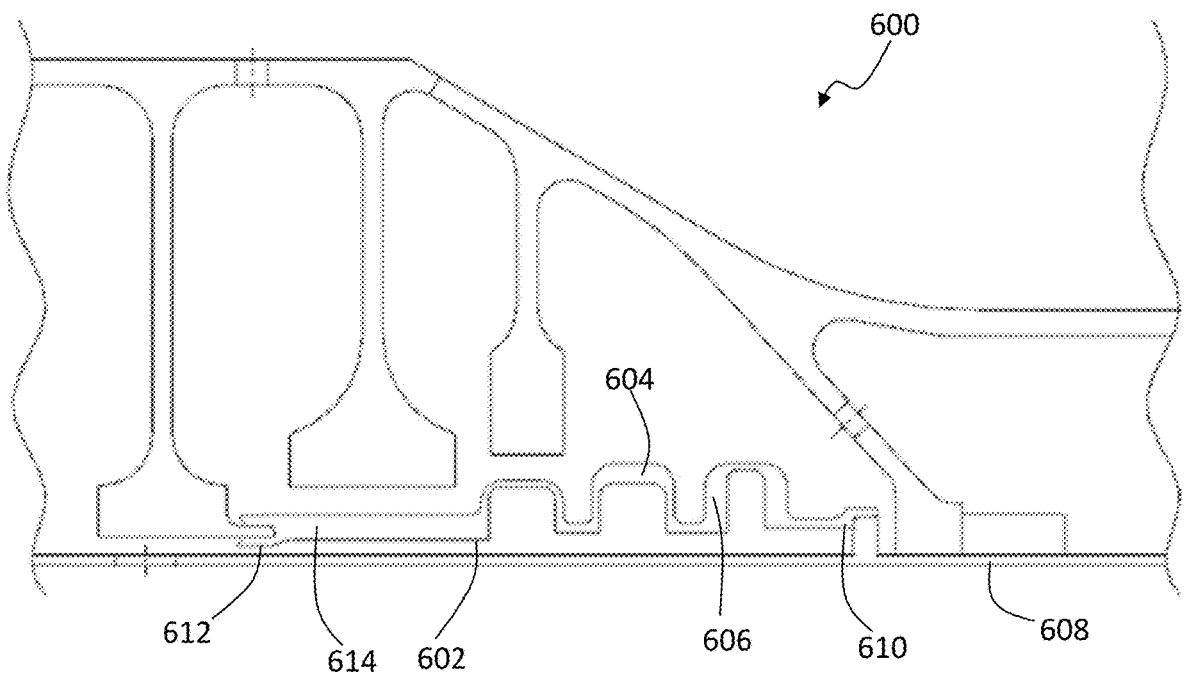
FIG. 6 is a schematic illustration of a rotor system of a gas turbine engine in accordance with an embodiment of the present disclosure.

Turning now to FIG. 6, a schematic illustration of a portion of a rotor system 600 having a seal tube 602 in accordance with an embodiment of the present disclosure is shown. The seal tube 602 is arranged to provide a fluid seal between a forward bore compartment and a rear bore compartment, similar to that described above. In this embodiment, the seal tube 602 includes multiple axial compliance elements having different material thicknesses. For example, one axial compliance element has an axial component 604 with an increased material thickness and another axial compliance element has a radial component 606 with an increased material thickness. FIG. 6 also illustrated the seal tube 602 attached to a engine shaft 608 at a rear end 610 of the seal tube 602. Further, in this illustrative configuration, a forward end 612 of the seal tube 602 connects in a different manner than that illustratively shown in the other embodiments. This may be achieved, in part, due to the seal tube 602 having an increased material thickness portion 614 at the forward end 612 of the seal tube 602.

Figure 7:
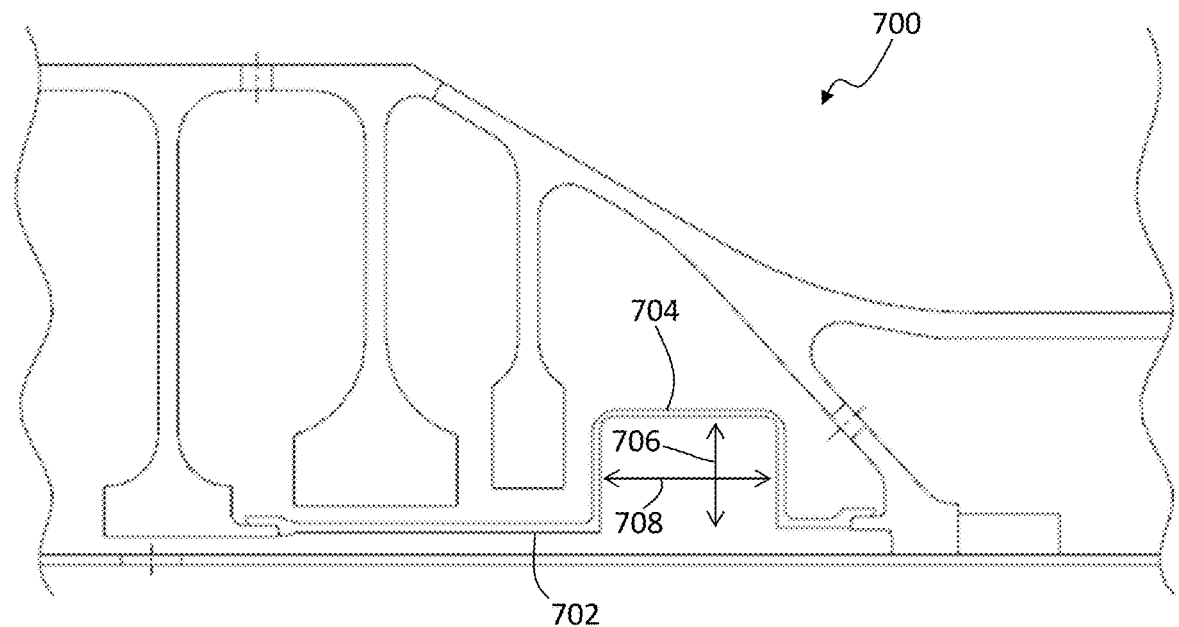
FIG. 7 is a schematic illustration of a rotor system of a gas turbine engine in accordance with an embodiment of the present disclosure.

Turning now to FIG. 7, a schematic illustration of a portion of a rotor system 700 having a seal tube 702 in accordance with an embodiment of the present disclosure is shown. The seal tube 702 is arranged to provide a fluid seal between a forward bore compartment and a rear bore compartment, similar to that described above. In this embodiment, the seal tube 702 includes a single axial compliance element 704. In this embodiment, the axial compliance element 704 has an increased radial height 706 and an increased axial length 708, as compared to the other illustrative embodiments. It will be appreciated that both the radial height 706 and the axial length 708 may be changed to achieve a desired axial compliance for the seal tube 702. Further, multiple axial compliance elements may be used even with greater height and/or length axial compliance elements, and thus such increased dimension configuration is not limited to situations where only a single axial compliance element is present.

Figure 8:
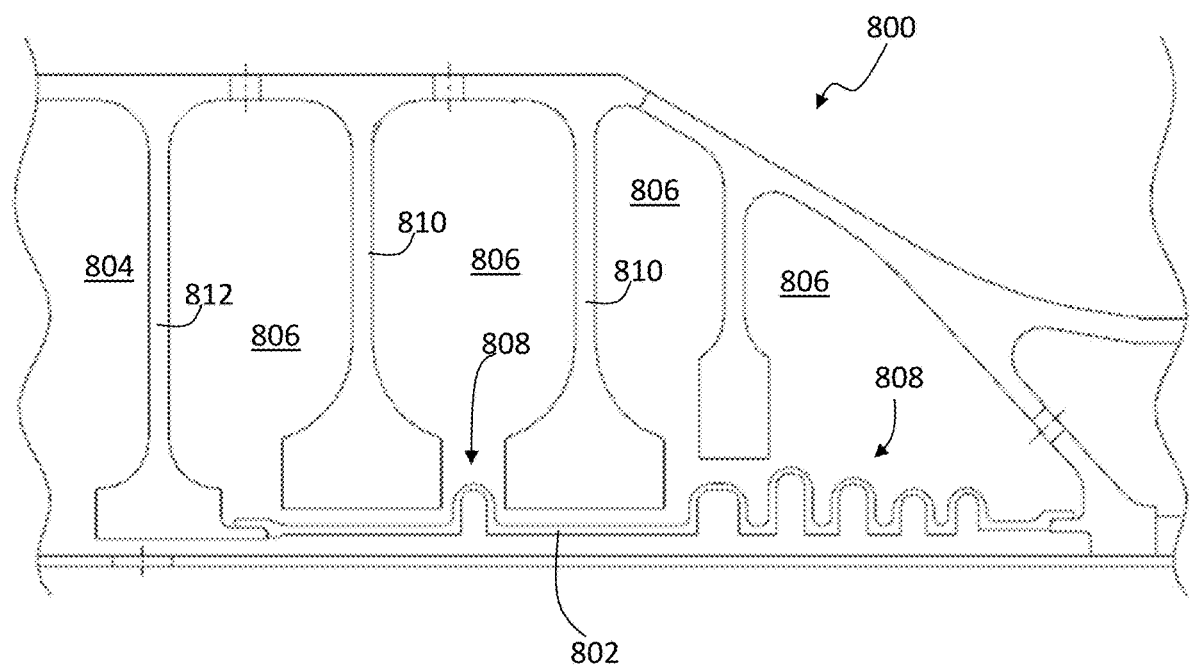
FIG. 8 is a schematic illustration of a rotor system of a gas turbine engine in accordance with an embodiment of the present disclosure.

Turning now to FIG. 8, a schematic illustration of a portion of a rotor system 800 having a seal tube 802 in accordance with an embodiment of the present disclosure is shown. The seal tube 802 is arranged to provide a fluid seal between a forward bore compartment 804 and a rear bore compartment 806, similar to that described above. In this embodiment, the seal tube 802 includes multiple axial compliance elements 808 and extends for a greater axial length than prior illustrated configurations. As shown, the seal tube 802 extends forward farther and thus the rear bore compartment 806 includes two rotor disks 810 in their entirety and the rear or aft side of another rotor disk 812. Further, as shown, the axial compliance elements 808 are not restricted to the location along the aft-most portion thereof. Rather, as shown, one or more axial compliance elements 808 may be arranged between forward rotor disks 810 within the rear bore compartment 806.

Figure 9:
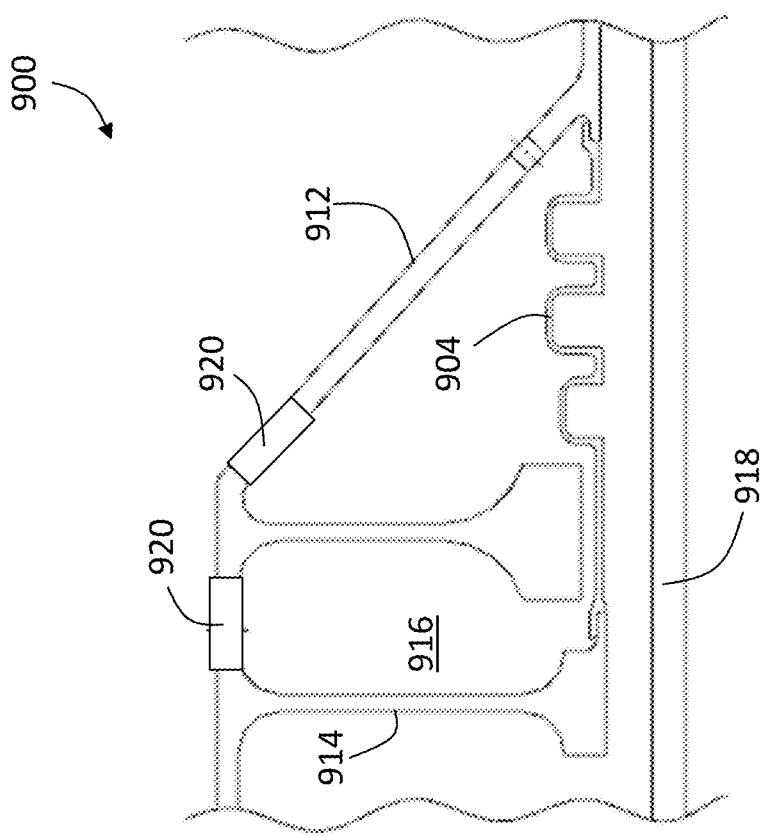
FIG. 9 is a schematic illustration of a rotor system of a gas turbine engine in accordance with an embodiment of the present disclosure.
Figure 9:
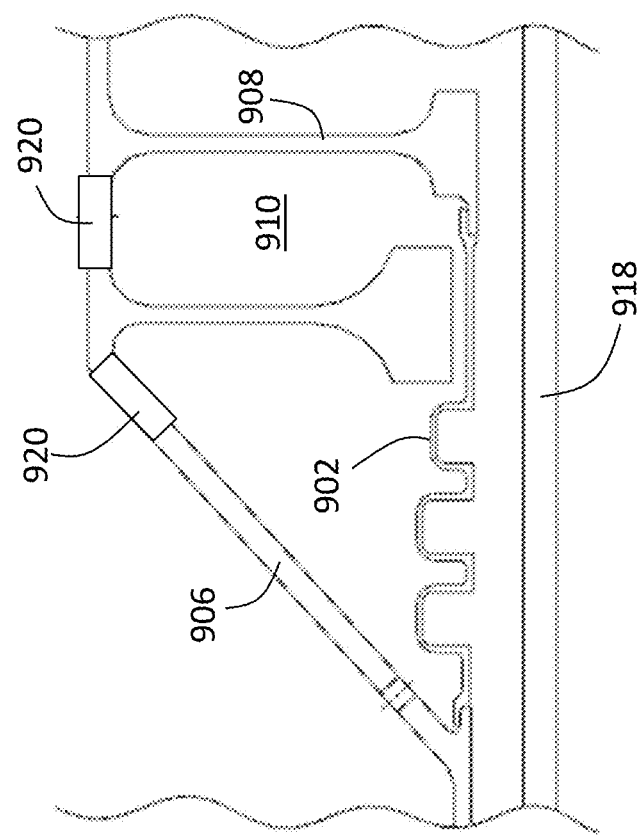

Turning now to FIG. 9, a schematic illustration of a portion of a rotor system 900 in accordance with an embodiment of the present disclosure is shown. In this embodiment, the rotor system 900 includes two seal tubes 902, 904 arranged to provide a fluid seal between various bore compartments of the rotor system 900. As shown, a forward seal tube 902 is arranged to connect between a forward hub 906 and a forward rotor 908 to define a forward bore compartment 910. Similarly, a rear seal tube 904 is arranged to connect between a rear hub 912 and a rear rotor 914 to define a rear bore compartment 916. In this configuration, the rotor system 900 is part of an engine that does not include a tie shaft, as described above, although a low spool shaft 918 is shown that connects between a turbine and a fan of the engine system. In this configuration, the rotors 908, 914 and other rotors of the rotor system may be part of a welded rotor drum or rotor stack, as will be appreciated by those of skill in the art. The rotors 908, 914, the hubs 906, 912, and other rotors of the rotor system 900 may be connected by one or more rotor connectors 920. The rotor connectors 920 may be welds, bolted-flange connections, or other connection devices or mechanisms, as will be appreciated by those of skill in the art.

In this embodiment, because there is no tie shaft, the seal tubes 902, 904 directly connect between the respective hubs 906, 912 and the respective rotors 908, 914. In some embodiments, the forward rotor 908 and the rear rotor 914 may be the same rotor, with the forward seal tube 902 attaching to a forward face of the rotor and the rear seal tube 904 attaching to a rear face of the rotor. In other embodiments, a seal tube may be connected between two rotors (e.g., not attached to the forward or rear hub). For example, with reference to FIG. 9, a seal tube could be attached to a rear face of the forward rotor 908 and a forward face of the rear rotor 914 and define a compartment therebetween.

It will be appreciated that the features illustrated and described in the embodiments of FIGS. 4A-9 may be mixed and matched to achieve a desired axial compliance for the seal tubes of the present disclosure. Different geometries, material thicknesses, numbers of axial compliance elements, connection points, etc. may be employed to achieve a desired sealing and axial compliance to maintain the seal and fluid separation during use and operation.

Advantageously, embodiments of the present disclosure are directed to seal tube configurations having built in undulations or axial compliance features that improve axial flexibility to maintain fluid separation of bore compartment cavities. The seal tubes described herein may reduce sliding at the seal tube interfaces with the mounting structures (e.g., tie shaft, rotor hub, etc.) which will reduce wear and improve rotor durability. Improved sealing may be achieved. Such sealing, as provided by the seal tubes described herein, even if not a perfect seal, may provide for more uniform sealing and thus more uniform leakage therethrough. Accordingly, improved control of any leakage from one bore compartment to another may be achieved.

In prior piston seal ring configurations used to separate the forward and rear bore compartments, the tolerances and end gap(s) may allow for non-uniform leakage and thermal conditioning at the seal interface. Configurations that use non-compliant sealing tubes and/or piston seal rings have the potential to transmit large non-uniform binding loads. The non-uniform leakage and/or binding loads caused by interface wear or part and assembly tolerances can result in centerline shift and high vibration. However, advantageously, in accordance with embodiments of the present disclosure, the seal tubes having retention features at the rotor interfaces can eliminates the potential for non-uniform leakage and improves engine reliability. Further, the axial compliance of the seal tubes described herein can reduce the magnitude of non-uniform axial loads, thus reducing vibration and improving reliability.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A rotor system comprising:
    an engine shaft;
    a forward hub connected to the engine shaft;
    a rear hub connected to the engine shaft;
    a rotor disk arranged between the forward hub and the rear hub; and
    a seal tube configured to define a forward hub compartment and a rear hub compartment between the forward hub and the rear hub and separated by the rotor disk and the seal tube, wherein the forward hub compartment is defined forward of the rotor disk and the rear hub compartment is defined aft of the rotor disk, wherein a portion of the forward hub compartment extends aftward past an axial position of the rotor disk along the engine shaft between the seal tube and the engine shaft, wherein the seal tube is connected at a forward end to of the rotor disk and at a rear end to at least one of the rear hub and the engine shaft, and
    wherein the seal tube comprises at least one axial compliance element configured to enable axial extension and compression of the seal tube in an axial direction along the engine shaft.

2. The rotor system of claim 1, further comprising a second rotor disk arranged forward of the rotor disk within the forward hub compartment.

3. The rotor system of claim 1, further comprising a second rotor disk arranged aft of the rotor disk within the rear hub compartment.

4. The rotor system of claim 1, wherein the at least one axial compliance element comprises a plurality of axial compliance elements between the forward end and the rear end of the seal tube.

5. The rotor system of claim 4, wherein at least two axial compliance elements of the plurality of axial compliance elements have different radial heights.

6. The rotor system of claim 4, wherein at least two axial compliance elements of the plurality of axial compliance elements have different axial lengths.

7. The rotor system of claim 4, wherein at least two axial compliance elements of the plurality of axial compliance elements have different geometric shapes.

8. The rotor system of claim 4, wherein at least two axial compliance elements of the plurality of axial compliance elements have different material thicknesses.

9. The rotor system of claim 1, wherein the at least one axial compliance element has a squared geometry.

10. The rotor system of claim 1, wherein the at least one axial compliance element has a rounded geometry.

11. The rotor system of claim 1, wherein the at least one axial compliance element has a triangular geometry.

12. The rotor system of claim 1, wherein the forward hub, the rear hub, and the rotor disk form a portion of a compressor section of a gas turbine engine.

13. The rotor system of claim 1, wherein the forward hub, the rear hub, and the rotor disk form a portion of a turbine section of a gas turbine engine.

14. The rotor system of claim 1, further comprising a plurality of airfoils connected to the rotor disk.

15. The rotor system of claim 1, wherein the seal tube connects at the forward end by one of radial snap fit, axial snap fit, welding, threaded connection, or interference fit.

16. The rotor system of claim 1, wherein the seal tube connects at the rear end by one of radial snap fit, axial snap fit, welding, threaded connection, or interference fit.

17. The rotor system of claim 1, wherein the engine shaft is a tie shaft and the seal tube connects to the tie shaft at the rear end of the seal tube.

18. A gas turbine engine comprising:
a combustor section;
a turbine section;
a compressor section; and
an engine shaft,
wherein at least one of the turbine section and the compressor section comprises a rotor system comprising:
a forward hub connected to the engine shaft;
a rear hub connected to the engine shaft;
a rotor disk arranged between the forward hub and the rear hub; and
a seal tube configured to define a forward hub compartment and a rear hub compartment between the forward hub and the rear hub and separated by the rotor disk and the seal tube, wherein the forward hub compartment is defined forward of the rotor disk and the rear hub compartment is defined aft of the rotor disk, wherein a portion of the forward hub compartment extends aftward past an axial position of the rotor disk along the engine shaft between the seal tube and the engine shaft,
wherein the seal tube is connected at a forward end to the rotor disk and at a rear end to at least one of the rear hub and the engine shaft, and
wherein the seal tube comprises at least one axial compliance element configured to enable axial extension.

19. The gas turbine engine of claim 18, wherein the at least one axial compliance element comprises a plurality of axial compliance elements between the forward end and the rear end of the seal tube.

20. The gas turbine engine of claim 18, wherein the at least one axial compliance element has one of a squared geometry, a rounded geometry, and a triangular geometry.

* * * * *